R. C. OSGOOD.
MINING MACHINE.
APPLICATION FILED JUNE 23, 1916. RENEWED JUNE 26, 1920.

1,370,477.   Patented Mar. 1, 1921.

Inventor:
Robert C. Osgood
by
Atty.

UNITED STATES PATENT OFFICE.

ROBERT C. OSGOOD, OF CLAREMONT, NEW HAMPSHIRE, ASSIGNOR, BY MESNE ASSIGNMENTS, TO THE JEFFREY MANUFACTURING COMPANY, OF COLUMBUS, OHIO, A CORPORATION OF OHIO.

MINING-MACHINE.

1,370,477.      Specification of Letters Patent.      Patented Mar. 1, 1921.

Application filed June 23, 1916, Serial No. 105,498. Renewed June 26, 1920. Serial No. 392,046.

*To all whom it may concern:*

Be it known that I, ROBERT C. OSGOOD, a citizen of the United States, residing at Claremont, in the county of Sullivan and State of New Hamsphire, have invented certain new and useful Improvements in Mining-Machines, of which the following is a full, clear, and exact specification.

My invention relates to mining machines. It has for its object to provide improved means whereby such a machine may be loaded onto its truck or unloaded from the same. A further object of my invention is to provide improved and simplified means of the character set forth, wherein the mining machine in its movement to or from the truck, automatically tilts the portion of the truck on which it is supported, and wherein improved coöperating automatically acting means hold the said tiltable portion in its several positions. These and other objects of my invention will hereinafter appear.

In the accompanying drawings, I have, for purposes of illustration, shown one embodiment which my invention may assume in practice.

In these drawings,—

Figure 1:
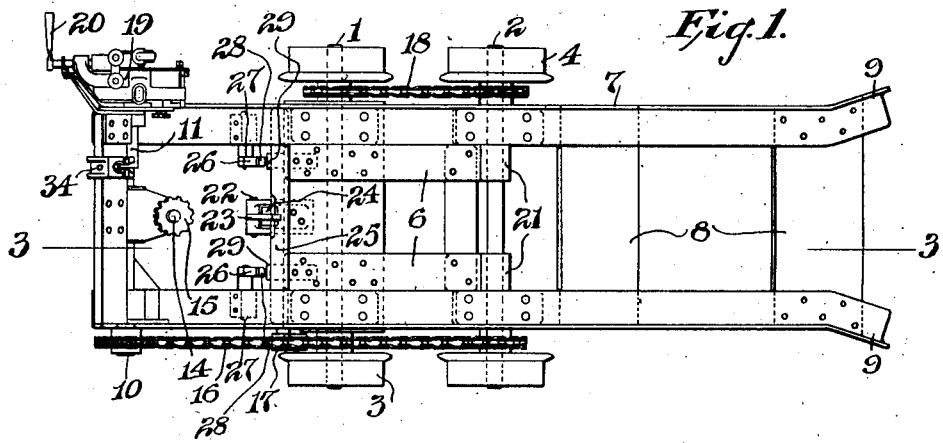
Figure 1 is a plan view of a mining machine truck equipped with my improvement.

In these drawings I have illustrated a four wheel truck including a plurality of axle members 1 and 2 carrying wheel 3 and 4 adapted to run on rails 5, the axle members being suitably rigidly connected, as by longitudinally disposed connections 6.

Upon this truck is carried a machine-carrying body or pan 7, which is preferably formed of longitudinally disposed, laterally spaced angle bars having horizontal and upstanding flanges suitably connected transversely by plates 8 in such a manner as to form a rigid frame. As shown, this body extends in front and rear of the truck, and is provided at its front end with a flared portion 9 to facilitate loading or unloading at an angle. At its rear end, this body is also provided in a well known manner with a transverse shaft 10, journaled in a suitable sleeve 11, which is in turn provided with a worm wheel 12 adapted to mesh with a worm 13 on a forwardly located vertical shaft 14 carrying a gear 15. One end of this shaft 10 is also connected through a chain and sprocket connection 16 with the front axle 2, the chain being normally held in elevated position so that it may pass freely over the axle 1 as the body is tilted, by means of guide rollers or sprockets 17. As shown, the opposite end of the axle 2 is also connected through a chain and sprocket connection 18 with the axle 1. By this connection, when the gear 15 is connected to the motor of the mining machine, rotation may be imparted to the axles, and the truck propelled along the track. If desired, suitable brake and clutch mechanism 19, of any well known form, may also be provided, preferably on the opposite end of the shaft 10 from the chain and sprocket connection 16, to control the connection of the sleeve 11 to the shaft 10, this mechanism 19 being preferably controllable by an operating lever 20.

Figure 2:
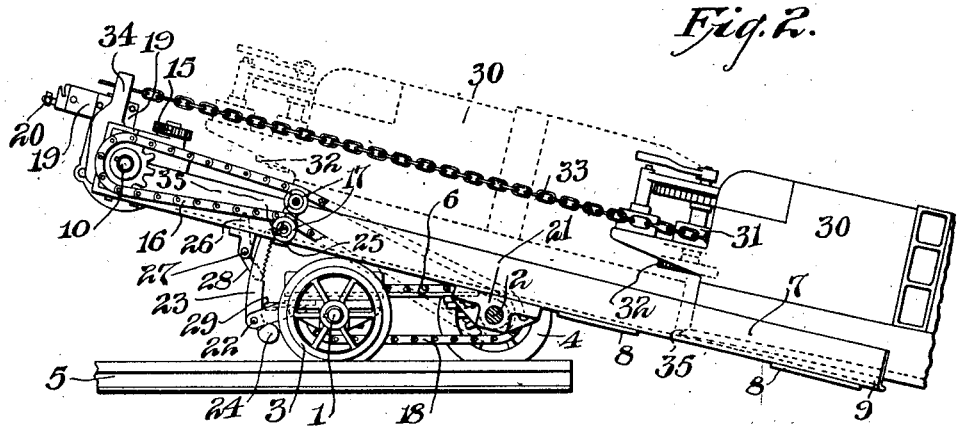
Fig. 2 is a side elevation of the truck in loading or unloading position with the mining machine shown in a plurality of positions thereon, certain parts being broken away to facilitate illustration.
Figure 3:
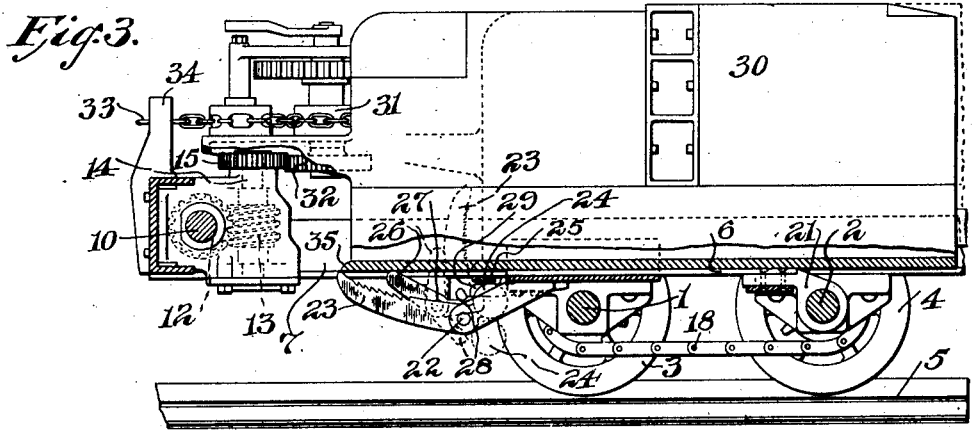
Fig. 3 is a central longitudinal sectional view taken on line 3—3 of Fig. 1 showing the mining machine in loaded position, the machine being in elevation and having only a portion broken away to facilitate illustration.

In my improved construction, the bottom of the body 7 is provided at a point substantially midway between its ends with laterally spaced depending brackets 21 which are pivotally connected to the front axle 2 so that the entire body may tilt about this axle from the position shown in Fig. 3 to the position shown in Fig. 2 to facilitate the unloading of the machine, and move back to the position shown in Fig. 3 when the machine is again loaded. More specifically, due to this construction, when the machine is on the body, as shown in Fig. 3, and is moved forward thereon to unload, as soon as the bulk of its weight passes the body pivot, the body will tilt forward to provide an inclined guide, the parts then assuming the position shown in Fig. 2. If the body is held in this position, the same will of course act as a guide when the machine is returned to the truck, the weight of the machine then automatically returning the body to the position shown in Fig. 3 when the bulk of its weight has passed beyond the body pivot.

It will be noted that I have herein shown a bell-crank pivoted at 22 on the wheeled truck at a point adjacent the center of the machine (Fig. 1). This bell-crank has an upstanding toothed portion 23 normally extending through the bottom of the body, and a weighted opposite end 24 (Fig. 2) normally tending to hold the toothed portion thereof in vertical position so that by providing a coöperating tooth engaging member 25 rigidly attached to the pan 7, this member 25 may be caused to engage the toothed portion 23 as the body is tilted, and hold the body securely in its tilted position so that the machine may be readily returned to the truck when it has finished cutting. In my improved construction, I have also provided a plurality of locking members 26 disposed on opposite sides of the bell-crank mentioned (Fig. 1), these locking members also preferably assuming the form of bell-cranks and being pivoted at 27 to the bottom of the body at points disposed in rear of the pivot of the body supporting bell-crank. As shown, the weight of these members 26 is such as normally to hold them in substantially vertical position with their ends projecting through the bottom of the body and into the path of the machine movable thereon. As illustrated, these locking members 26 are also provided with locking portions 28 on their lower ends adapted to move up under and interlock with projections 29 formed on the underside of the wheeled truck.

In the use of the device shown, the mining machine, shown at 30, is provided, as usual, with a suitable feed chain or cable driving member 31 rotatable by the motor inclosed in the mining machine casing, and a gear 32, adapted to engage the gear 15, is also provided beneath this driving member and connected to the motor. When it is desired to unload the machine, one end of the cable or chain, herein shown as a chain 33, is fixed at a point adjacent the face, and the machine fed off of the body onto the floor, tilting the body and releasing the body supporting member, which then swings up to the position shown in Fig. 2 and, through the engagement of the member 25 therewith, acts as a support holding the body in tilted position. When it is again desired to load the machine, the opposite end of the chain 33 is connected to a post 34 on the rear end of the body, and the machine is fed along the chain in an opposite direction. Obviously, some part of the machine, preferably the shoe 35, will then strike the upstanding end 23 of the body supporting member when the machine is in substantially the position shown in dotted lines in Fig. 2, with the result that this member will be thrown back about its pivot and the body permitted to drop down from the position shown in Fig. 2 to the position shown in Fig. 3. It will be noted that the shoe 35 will also strike the locking members 26 carried on the body, and swing those members from the position shown in Fig. 2 to the position shown in Fig. 3, wherein their locking ends 28 are brought up in under the projections 29 on the wheeled truck, the body and wheeled truck thereby being securely locked and held in that relation by weight of the machine. It will of course be obvious that as the machine moves from the position shown in dotted lines in Fig. 2, to the position shown in Fig. 3, its gear 32 will be brought into mesh with the gear 15 on the body so that by a suitable manipulation of the controlling lever 20, the truck may thereafter be propelled along the track and controlled during its movement.

In my improved construction wherein the body is pivoted at the front of the truck, it will be noted that it is possible to provide a truck of standard construction with means whereby the machine carrying portion thereof may be made to tilt to any desired angle with respect to the floor, and thereby greatly facilitate the unloading of the machine on uneven floors. It will also be noted that means are provided which are adapted to coöperate automatically with the machine and hold the entire machine carrying portion of the truck in any tilted position and release the same therefrom automatically and at such a time that the machine may settle down upon its wheeled truck without appreciable jar, the tilting portion of the truck being thereafter also automatically locked to its wheeled support. In connection with the truck driving mechanism, it will also be observed that through my improved connections the same is operatively connected to the truck wheels in any angular position of the machine carrying body, and that as a result the wheels 4 are effectually braked either through the resistance of the brake mechanism or the resistance of the driving connections between the shaft 10 and the gear 15, any tendency of the truck to move longitudinally of the rails when in tilted position thus being avoided at the same time that any difficulty arising from disconnection of the driving connections as a result of the tilting operation, is also overcome. Attention is also directed to the fact that the mechanism herein described may be readily applied to a truck of standard construction at a small cost, and that the mechanism is of an exceedingly rugged character which is well adapted to withstand wear in service. These and other advantages of my improved construction will, however, be clearly apparent to those skilled in the art.

While I have in this application specifically described one embodiment which my invention may assume in practice, it is to be understood that the form thereof shown herein is used for purposes of illustration and that the invention may be embodied in other forms without departing from its spirit, it being my intention to include all such forms within the scope of the appended claims.

What I claim as new and desire to secure by Letters Patent is:

1. In a mining machine, a wheeled truck, a machine carrying body pivoted at the front thereof and tiltable by a machine movable thereover, and machine-driven, truck-driving mechanism on said body.

2. In a mining machine, a wheeled truck, a machine-carrying body pivoted at the front thereof and tiltable by a machine movable thereover, and means for retaining said body in tilted position.

3. In a mining machine, a wheeled truck, a machine-carrying body pivoted at the front thereof and tiltable by a machine movable thereover, and automatically acting means for retaining said body in tilted position.

4. In a mining machine, a wheeled truck, a tiltable machine-carrying body pivoted thereon, and means for supporting said body in its tilted position when the same is disposed at any one of a plurality of angles.

5. In a mining machine, a wheeled truck, a tiltable machine-carrying body pivoted thereon, and means for supporting said body disposed in rear of the pivot thereof and movable into supporting relation therewith at any angle thereof.

6. In a mining machine, a wheeled truck, a machine-carrying body pivoted to the front thereof, and supporting means therefor disposed in rear of the pivot thereof and automatically controlled by a machine movable thereover.

7. In a mining machine, a wheeled truck, a machine-carrying body pivoted at the front thereof and tiltable by a machine movable thereover, and means for retaining said body in tilted position controlled by said machine.

8. In a mining machine, a wheeled truck, a machine-carrying body pivoted at the front thereof and tiltable by a machine movable thereover, and means for retaining said body in tilted position releasable by said machine.

9. In a mining machine, a wheeled truck, a machine-carrying body pivoted at the front thereof and tiltable by a machine movable thereover, means for retaining said body in tilted position releasable by said machine, and supplemental means for locking said body to said truck.

10. In a mining machine, a wheeled truck, a machine-carrying body pivotally mounted thereon and tiltable by a machine movable thereover, means for retaining said body in tilted position releasable by said machine, and supplemental means controllable by said machine for locking said body to said truck.

11. In a mining mechanism having a cutting machine element, a wheeled truck having front and rear axles, a body pivoted on said front axle for supporting the said cutting machine element and extending from the axle to the rear end of the cutting machine when the latter is in its rearmost position, said body being tiltable about said front axle to and from unloading position by a cutting machine movable thereover, and means attached to the tilting rear end of the body for moving the cutting machine on and relatively to the truck.

12. In a mining machine, a truck having front and rear axles, wheels on said axles, a machine-carrying body pivoted on said front axle and tiltable by a machine moving thereover, wheel-driving mechanism on said body, and operative connections between the wheels and said wheel-driving mechanism.

13. In a mining machine, a wheeled truck having front and rear axles, a machine-carrying body pivoted on said front axle and extending in rear of said rear axle, said body being tiltable about said front axle to and from unloading position by a machine movable thereover, and automatic means controlled by said machine for supporting said body in tilted position.

14. In a mining machine, a wheeled truck having front and rear axles, a machine-carrying body pivoted on said front axle and extending in rear of said rear axle, said body being tiltable by a machine movable thereover, and coöperating means on said body and truck for retaining said body in tilted position.

15. In a mining machine, a wheeled truck having front and rear axles, a machine-carrying body pivoted on said front axle and extending over said rear axle, said body being tiltable by a machine movable thereover, and coöperating means on said body and truck and controllable by said machine for retaining said body in tilted position.

16. In a mining machine, a wheeled truck having front and rear axles, a machine-carrying body pivoted on said front axle and extending over said rear axle and tiltable by a machine movable thereover, and automatically acting means on one of said elements engageable with the other as said body is tilted.

17. In a mining machine, a rigid wheeled truck, a machine-carrying body pivoted thereon and tiltable by a machine movable thereover, and means for supporting said body in tilted position including a lever pivoted on one of said elements and engageable with the other of said elements, said lever extending into the path of a machine movable over said body.

18. In a mining machine, a truck, a machine-carrying body pivoted thereon and tiltable by a machine movable thereover, a bell crank lever pivoted on said truck and having a toothed arm and a weighted arm, and means on said body engageable with said toothed arm as said body is tilted by said machine.

19. In combination, a rigid wheeled truck, a machine carrying body tiltable about a fixed pivot on the front end thereof and extending beyond the rear end thereof, truck driving mechanism carried on the rear end of said body automatically engageable with a machine reciprocable thereon, and means for supporting said body in a plurality of angular positions.

20. In combination, a rigid wheeled truck, a machine carrying body tiltable about a fixed pivot on the front end thereof and extending beyond the rear end thereof, truck driving mechanism carried on the rear end of said body automatically engageable with a machine reciprocable thereon, and automatically acting means controlled by a moving machine for supporting said body in a plurality of angular positions.

21. In combination, a wheeled truck, a machine carrying body tiltably mounted thereon, truck driving mechanism on said body, and means for driving the truck wheels therefrom including a connection in constant driving relation with respect to said wheels in any position of said body.

22. In combination, a wheeled truck, a machine carrying body tiltable about a pivot at the front end thereof, truck driving mechanism carried at the rear end of said body, and driving connections between said truck driving mechanism and certain of the wheels of said truck operatively connected to the latter substantially coincident with the axis of said truck body.

23. In combination, a wheeled truck, a machine carrying body tiltable about a pivot at the front end thereof, truck driving mechanism carried at the rear end of said body, flexible driving connections between said truck driving mechanism and certain of the wheels of said truck operatively connected to the latter substantially coincident with the axis of said truck body, and guiding means for said flexible driving connections.

24. In combination, a wheeled truck, a machine carrying body tiltable about a pivot at the front end thereof, a truck driving mechanism carried at the rear end of said body, driving connections between said truck driving mechanism and certain of the wheels of said truck operatively connected to the latter substantially coincident with the axis of said truck body, and driving connections between said wheels and the remaining truck wheels.

25. In combination, a wheeled truck, a machine carrying body tiltable about a pivot at the front end thereof, truck driving mechanism carried at the rear end of said body, driving connections between said truck driving mechanism and certain of the wheels of said truck operatively connected to the latter substantially coincident with the axis of said truck body, and means for supporting said body in a plurality of angular positions with respect to said truck.

26. In combination, a wheeled truck, a machine carrying body tiltable about a pivot at the front end thereof, truck driving mechanism carried at the rear end of said body, driving connections between said truck driving mechanism and certain of the wheels of said truck operatively connected to the latter substantially coincident with the axis of said truck body, and means for supporting said body in a plurality of angular positions with respect to said truck automatically controlled by a machine movable over said body.

27. In a mining mechanism, a truck, a machine-carrying body pivoted thereon, and tiltable by a machine movable thereover, body supporting means including a bell crank lever pivoted on one of said elements, to-wit, the truck and the body, and engageable with the other, said bell crank lever extending in the path of a machine movable over said body, and a supplemental latch engageable with a fixed part of said truck and with a machine movable over said body.

28. In a mining machine, a truck, a machine-carrying body pivoted thereon and tiltable by a machine movable thereover, body-supporting means including a bell crank lever pivoted on one of said elements and engageable with the other of said elements, said bell crank lever extending in the path of a machine movable over said body, and a plurality of latches disposed on opposite sides of said bell crank lever, and engageable with a machine movable over said body and with said truck.

In testimony whereof I affix my signature.

ROBERT C. OSGOOD.